US009626313B2

(12) United States Patent
Acharya (10) Patent No.: US 9,626,313 B2
(45) Date of Patent: Apr. 18, 2017

(54) TRACE BUFFER BASED REPLAY FOR CONTEXT SWITCHING (71) Applicant: QUALCOMM Incorporated, San Diego, CA (US)

(72) Inventor: Anirudh Rajendra Acharya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/575,498

(22) Filed: Dec. 18, 2014

(65) Prior Publication Data
US 2016/0179714 A1  Jun. 23, 2016

(51) Int. Cl.
| G06F 7/38 | (2006.01) |
| G06F 11/00 | (2006.01) |
| G06F 13/24 | (2006.01) |
| G06F 12/02 | (2006.01) |
| G06F 9/38 | (2006.01) |

(Continued)

(52) U.S. Cl.
CPC ............ *G06F 13/24* (2013.01); *G06F 9/3808* (2013.01); *G06F 9/3832* (2013.01); *G06F 9/3851* (2013.01); *G06F 9/3863* (2013.01); *G06F 9/3879* (2013.01); *G06F 9/461* (2013.01); *G06F 11/00* (2013.01); *G06F 12/023* (2013.01); *G06T 1/20* (2013.01); *G06F 2212/251* (2013.01)

(58) Field of Classification Search
None
See application file for complete search history.

(56) References Cited

U.S. PATENT DOCUMENTS

| 6,098,167 A | 8/2000 | Cheong et al. |
| 8,365,015 B1 | 1/2013 | Yu et al. |

(Continued)

FOREIGN PATENT DOCUMENTS

| EP | 1068570 A1 | 1/2001 |
| WO | 9618950 A2 | 6/1996 |

OTHER PUBLICATIONS

Response to Written Opinion dated Mar. 16, 2016, from International Application No. PCT/US2015/063462, filed on Aug. 16, 2016, 4 pp.

(Continued)

*Primary Examiner* — Hyun Nam
(74) *Attorney, Agent, or Firm* — Shumaker & Sieffert, P.A.

(57) ABSTRACT

A command processor may process a command stream for execution by at least one processor, including storing data associated with a first set of one or more operations in the command stream in a trace buffer, wherein the first set of one or more operations accesses one or more memory locations in memory, and wherein the data include an indication of contents of the one or more memory locations associated with the first set of one or more operations. The command processor may interrupt the processing of the command stream. The command processor may, in response to resuming processing of the command stream subsequent to the interrupting of the processing of the command stream, replay at least a portion of the command stream, including processing a second set of one or more operations of the command stream based at least in part on the data stored in the trace buffer.

30 Claims, 5 Drawing Sheets (51) Int. Cl.
*G06F 9/46* (2006.01)
*G06T 1/20* (2006.01)

(56) References Cited

U.S. PATENT DOCUMENTS

| | | | |
|---|---|---|---|
| 2004/0054815 A1* | 3/2004 | Carlton Broberg, III | G01R 31/31705 710/1 |
| 2005/0050307 A1 | 3/2005 | Reinhardt et al. | |
| 2005/0223364 A1* | 10/2005 | Peri | G06F 11/3636 717/128 |
| 2008/0115115 A1* | 5/2008 | Codrescu | G06F 11/3656 717/128 |
| 2008/0126877 A1* | 5/2008 | Alsup | G06F 11/3636 714/45 |
| 2010/0281308 A1* | 11/2010 | Xu | G06F 11/3636 714/45 |
| 2013/0007762 A1 | 1/2013 | Krishnamurthy | |
| 2013/0159780 A1* | 6/2013 | Bedwell | G06F 11/3466 714/45 |

OTHER PUBLICATIONS

Akkary, et al., "Checkpoint Processing and Recovery: Towards Scalable Large Instruction Window Processors," Proceedings of the 36th Annual IEEE/ACM International Symposium on Microarchitecture, Dec. 3-5, 2003, pp. 423-434.

Xu, et al., "ReTrace: Collecting Execution Trace with Virtual Machine Deterministic Replay," Workshop on Modeling, Benchmarking and Simulation (MoBS), Jun. 2007, 8 pp.

Hwu et al.,"Checkpoint Repair for High-Performance Out-of-Order Execution Machines," IEEE Transactions on Computers, IEEE Service Center, Los Alamitos, CA, US, vol. C-36, No. 12, Dec. 1987, pp. 1496-1514, KP000942098, ISSN: 0018-9340.

International Search Report and Written Opinion from International Application No. PCT/US2015/063462, dated Mar. 16, 2016, 16 pp.

International Preliminary Report on Patentability from International Application No. PCT/US2015/063462, dated Nov. 17, 2016, 10 pp.

* cited by examiner

TRACE BUFFER BASED REPLAY FOR CONTEXT SWITCHING

TECHNICAL FIELD

The disclosure relates to replay of a command stream.

BACKGROUND

As the performance of specialized processors, such as graphics processing units (GPUs), that includes multiple processing cores, continues to increase at a rapid rate, computer programs are increasingly being written to take advantage of such specialized processors in a heterogeneous computing system. For example, a host processor, such as a central processing unit (CPU) may be able to offload processing of one or more portions of computer applications onto a secondary processor, such as a GPU, by sending one or more command streams including operations that the GPU may execute. In this way, a computing system including both a CPU and a GPU may be able to more efficiently execute computer applications.

SUMMARY

In general, aspects of the disclosure are directed to context switching of a processing unit and a trace buffer based replay of a command stream that is executed by a processing unit, such as a GPU. The trace buffer may ensure the consistency of operations in the command stream during replay of the command stream by storing data associated with memory locations upon which the operations in the command stream depend.

In one aspect, the disclosure is directed to a method for replaying a command stream, comprising: processing, by a command processor, a command stream for execution by at least one processor, including storing, by the command processor, data associated with a first set of one or more operations in the command stream in a trace buffer, wherein the first set of one or more operations in the command stream accesses one or more memory locations in memory, and wherein the data associated with the first set of one or more operations include an indication of contents of the one or more memory locations associated with the first set of one or more operations; interrupting, by the command processor, the processing of the command stream; and in response to resuming, by the command processor, processing of the command stream subsequent to the interrupting of the processing of the command stream, replaying, by the command processor, at least a portion of the command stream, including processing, by the command processor, a second set of one or more operations of the command stream based at least in part on the data stored in the trace buffer that is associated with the first set of one or more operations.

In another aspect, the disclosure is directed to a device configured for of graphics or compute processing comprising: at least one processor; a memory; and a command processor configured to: process a command stream for execution by the at least one processor, including storing data associated with a first set of one or more operations in the command stream in a trace buffer, wherein the first set of one or more operations in the command stream accesses one or more memory locations in the memory, and wherein the data associated with the first set of one or more operations include an indication of contents of the one or more memory locations associated with the first set of one or more operations; interrupt the processing of the command stream; and in response to resuming processing of the command stream subsequent to the interrupting of the processing of the command stream, replay at least a portion of the command stream, including processing a second set of one or more operations of the command stream based at least in part on the data stored in the trace buffer that is associated with the first set of one or more operations.

In another aspect, the disclosure is directed to a computer-readable storage medium having instructions stored thereon that when executed cause one or more processors to perform operations comprising: processing a command stream for execution by at least one processor, including storing, by the command processor, data associated with a first set of one or more operations in the command stream in a trace buffer, wherein the first set of one or more operations in the command stream accesses one or more memory locations in memory, and wherein the data associated with the first set of one or more operations include an indication of contents of the one or more memory locations associated with the first set of one or more operations; interrupting the processing of the command stream; and in response to resuming processing of the command stream subsequent to the interrupting of the processing of the command stream, replaying at least a portion of the command stream, including processing a second set of one or more operations of the command stream based at least in part on the data stored in the trace buffer that is associated with the first set of one or more operations.

In another aspect, the disclosure is directed to a device comprising: means for processing a command stream for execution by at least one processor, including storing, by the command processor, data associated with a first set of one or more operations in the command stream in a trace buffer, wherein the first set of one or more operations in the command stream accesses one or more memory locations in memory, and wherein the data associated with the first set of one or more operations include an indication of contents of the one or more memory locations associated with the first set of one or more operations; means for interrupting the processing of the command stream; and in response to resuming processing of the command stream subsequent to the interrupting of the processing of the command stream, means for replaying at least a portion of the command stream, including means for processing a second set of one or more operations of the command stream based at least in part on the data stored in the trace buffer that is associated with the first set of one or more operations.

The details of one or more aspects of the disclosure are set forth in the accompanying drawings and the description below. Other features, objects, and advantages of the disclosure will be apparent from the description and drawings, and from the claims.

DETAILED DESCRIPTION

In general, aspects of the disclosure are directed to techniques for context switching of a processing unit and a trace buffer based replay of a command stream that is executed by a processing unit, such as a graphics processing unit (GPU). On a mobile system on a chip (SoC) integrated circuit, spatial partitioning for various workloads, such as dividing processing cores so that individual cores may process different workloads, may not be practical due to constraints of the silicon area. The GPU may be better utilized by temporally partitioning of the GPU resources to allow various processes to make forward progress. The temporal partitioning process can be achieved via context switching, so that the GPU may switch between processing multiple command streams. In context switching, the GPU may be interrupted during the processing of a command stream and switched to process another command stream. The GPU may subsequently switch back to processing the interrupted command stream. Context switching on the GPU may potentially encounter different challenges compared with context switching on the CPU. For example due to deeper pipeline than CPU and various programmable and fixed function hardware blocks, context switching may require an enormous amount of state tracking A GPU driver, executing on a host processor, may send to the GPU workload/state information as a stream of commands (i.e., a command stream) that is decoded by a command/stream processor, such as a command processor of the GPU or any other suitable stream processor. A command stream may include one or more checkpoints in the command stream that can be used as a restart point. The checkpoint may allow for fast switching between streams. This scheme is called 'replay' because the command stream, upon being restarted, may encounter operations of the command stream it has already previously encountered prior to the context switch.

While the GPU driver streams one or more command stream to the GPU, any external memory contents that the command stream relies upon may be short lived and thus unavailable when the GPU switches back to processing the interrupted command stream because the contents of those memory contents may have changed while the command stream was interrupted. Thus, any external memory dependency of the command stream may not be guaranteed for an arbitrary amount of time considering the uncertainty in context switching. As such, the command stream during replay may not be exactly the same as before the context was switched, thereby execution of the command stream may result in errors.

To ensure the consistency of operations in the command stream during replay of the command stream, a trace buffer may store data associated with memory locations upon which the operations in the command stream depend. In the context of debugging, tracing is the process of logging relevant information as the execution of code progresses. At the end of a run, important events during the execution are captured in traces that are valuable in debugging. The concept of tracing can be applied to the present invention via use of the trace buffer. The GPU may record into the trace buffer important events and/or data generated/used during execution. The information recorded into the trace buffer can be later consumed, as is, for re-executing the command stream.

The trace buffer may track external memory read/writes as well as the contents of the external memory to ensure that the command stream during replay is the same as before the context was switched. For example, the trace buffer can store the history of a memory location, processed packets and/or commands, snapshots of required memory reads, predicates for control flow, flags for completed external memory syncs, and any other packets that depend upon external memory.

In accordance with aspects of the present disclosure, the command processor may process a command stream for execution by at least one processor, including storing, by the command processor, data associated with a first set of one or more operations in the command stream in a trace buffer, wherein the first set of one or more operations in the command stream accesses one or more memory locations in memory, and wherein the data associated with the first set of one or more operations include an indication of contents of the one or more memory locations associated with the one or more operations. The command processor may interrupt the processing of the command stream. The command processor may, in response to resuming processing of the command stream subsequent to the interrupting of the processing of the command stream, replay at least a portion of the command stream based at least in part on the data stored in the trace buffer, including processing, by the command processor, a second set of one or more operations of the command stream based at least in part on the data stored in the trace buffer.

Figure 1:
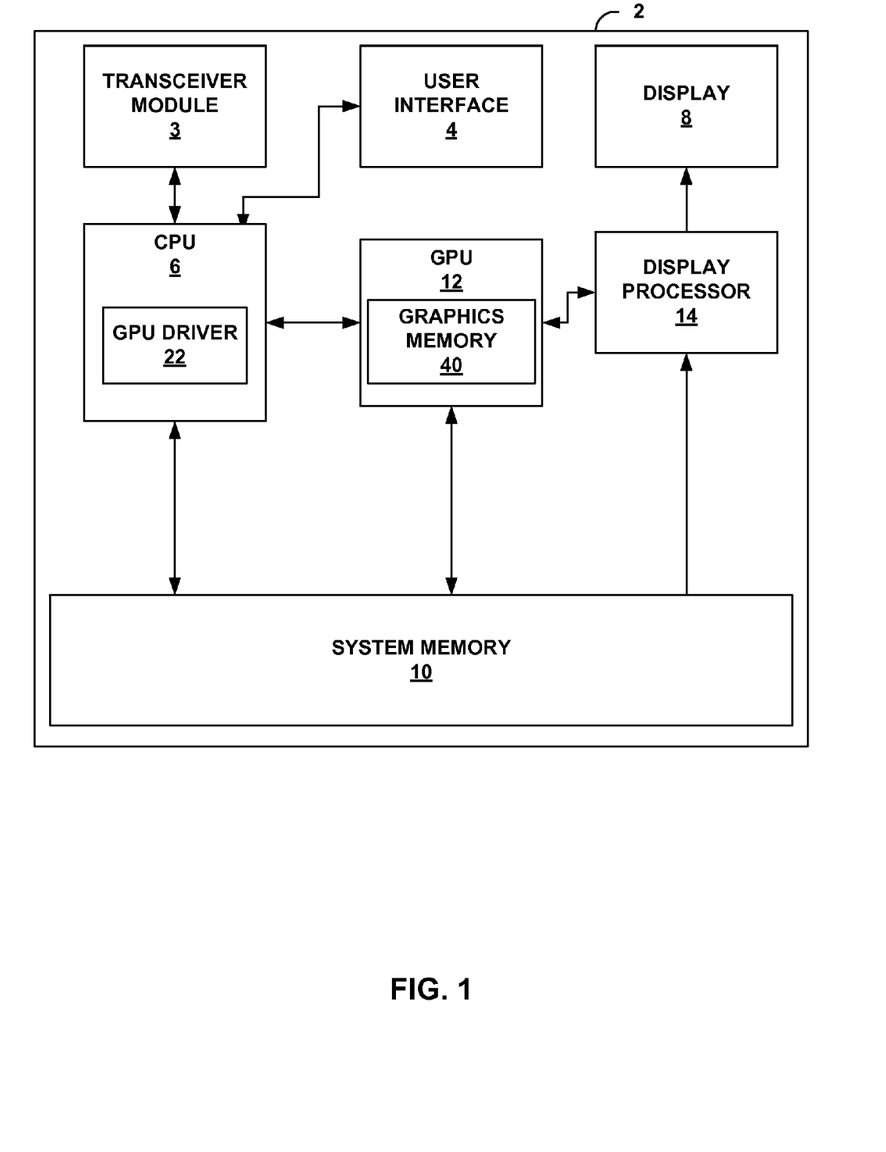
FIG. 1 is a block diagram illustrating an example computing device that may be configured to implement one or more aspects of this disclosure.

FIG. 1 is a block diagram illustrating an example computing device that may be configured to implement one or more aspects of this disclosure. As shown in FIG. 1, computing device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, computing device 2 may include central processing unit (CPU) 6, system memory 10, and GPU 12. Computing device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Computing device 2 may include additional modules or units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a video camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver module 3 may include circuitry to allow wireless or wired communication between computing device 2 and another device or a network. Transceiver module 3 may include modulators, demodulators, amplifiers and other such circuitry for wired or wireless communication.

Processor 6 may be a microprocessor, such as a central processing unit (CPU) configured to process instructions of a computer program for execution. Processor 6 may comprise a general-purpose or a special-purpose processor that controls operation of computing device 2. A user may provide input to computing device 2 to cause processor 6 to execute one or more software applications. The software applications that execute on processor 6 may include, for example, an operating system, a word processor application, an email application, a spreadsheet application, a media player application, a video game application, a graphical user interface application or another program. Additionally, processor 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

The software applications that execute on processor 6 may include one or more graphics rendering instructions that instruct processor 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™) or any other public or proprietary standard GPU compute API. In order to process the graphics rendering instructions, processor 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on processor 6 requires graphics processing, processor 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than processor 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using processor 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with processor 6, such as in a system on chip (SOC) GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

In some examples, graphics memory 40 may be part of GPU 12. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and output values that cause the pixels of display 8 to illuminate to display the image. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device.

Figure 2:
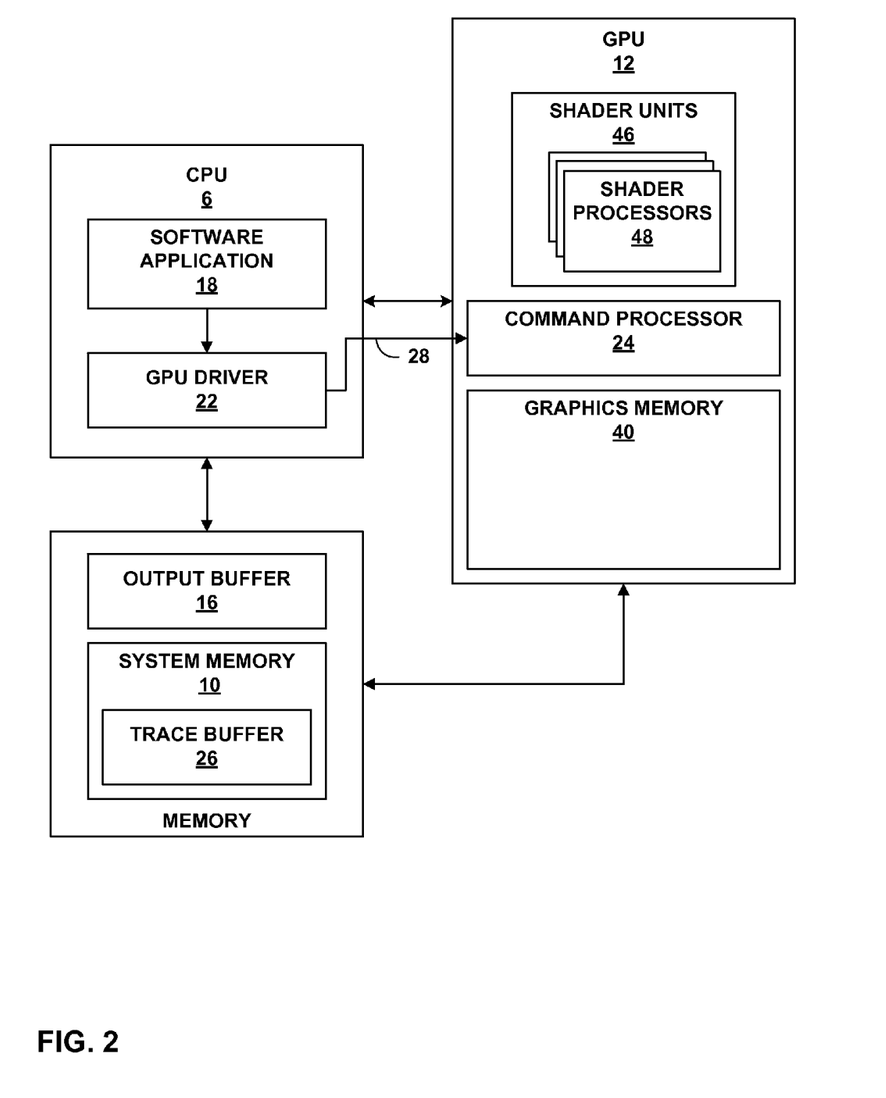
FIG. 2 is a block diagram illustrating example implementations of the example processor, the example GPU, and the example system memory of FIG. 1 in use with a trace buffer.

FIG. 2 is a block diagram illustrating example implementations of processor 6, GPU 12, and system memory 10 of FIG. 1 in use with a trace buffer. As shown in FIG. 2, processor 6 may execute at least one software application 18 and GPU driver 22, each of which may be one or more software applications or services.

Memory available to processor 6 and GPU 12 may include system memory 10 and output buffer 16. Output buffer 16 may be a part of system memory 10 or may be separate from system memory 10. Output buffer 16 may store rendered image data, such as pixel data, as well as any other data.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, to issue one or more commands to GPU 12 for rendering one or more graphics primitives into displayable graphics images. For example, software application 18 may invoke GPU driver 22 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors 48 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 associated with a display device. In some examples, the graphics processing pipeline may include fixed function logic and/or be executed on programmable shader cores.

Output buffer 16 stores destination pixels for GPU 12. Each destination pixel may be associated with a unique screen pixel location. In some examples, output buffer 16 may store color components and a destination alpha value for each destination pixel. For example, output buffer 16 may store Red, Green, Blue, Alpha (RGBA) components for each pixel where the "RGB" components correspond to color values and the "A" component corresponds to a destination alpha value. Although output buffer 16 and system memory 10 are illustrated as being separate memory units, in other examples, output buffer 16 may be part of system memory 10. Further, as discussed above, output buffer 16 may also be able to store any suitable data other than pixels.

In some examples, a graphics processing pipeline may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units 46 in GPU 12. Shader units 46 may be configured as a programmable pipeline of processing components. In some examples, shader unit 46 may be referred to as "shader processors" or "unified shaders," and may perform geometry, vertex, pixel, or other shading operations to render graphics. Shader units 46 may include one or more shader processors 48, each of which may include one or more components for fetching and decoding operations, one or more ALUs for carrying out arithmetic calculations, one or more memories, caches, and registers.

GPU 12 may designate shader units 46 to perform a variety of shading operations such as vertex shading, hull shading, domain shading, geometry shading, pixel shading, and the like by sending commands to shader units 46 to execute one or more of a vertex shader stage, a hull shader stage, a domain shader stage, a geometry shader stage, and a pixel shader stage in a graphics processing pipeline. In some examples, GPU driver 22 may cause a compiler executing on CPU 6 to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of shader units 46 within GPU 12. For example, the shader programs may include vertex shader programs that may be executed by shader units 46 to perform the functions of a vertex shader stage, hull shader programs that may be executed by shader units 46 to perform the functions of a hull shader stage, domain shader programs that may be executed by shader unit 46 to perform the functions of a domain shader stage, geometry shader programs that may be executed by shader unit 46 to perform the functions of a geometry shader stage and/or pixel shader programs that may be executed by shader units 46 to perform the functions of a pixel shader. A vertex shader program may control the execution of a programmable vertex shader unit or a unified shader unit, and include instructions that specify one or more per-vertex operations.

Graphics memory 40 may include on-chip storage or memory that is physically integrated into the integrated circuit chip of GPU 12. If graphics memory 40 is on-chip, GPU 12 may be able to read values from or write values to graphics memory 40 more quickly than reading values from or writing values to system memory 10 via a system bus.

CPU 6 processes instructions for execution within computing device 2. Host processor 24 may be capable of processing instructions stored in system memory 10. CPU 6 may generate a command stream using a driver (e.g., GPU driver 22 which may be implemented in software executed by CPU 6) for execution by GPU 12. That is, host processor 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphics data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6. Examples include a variety of image processing functions, including video decoding and post processing (e.g., deblocking, noise reduction, color correction, and the like) and other application specific image processing functions (e.g., facial detection/recognition, pattern recognition, wavelet transforms, and the like). In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor.

CPU 6 may communicate with GPU 12 to direct GPU 12 to execute GPGPU applications via GPU driver 22. GPU driver 22 may communicate, to GPU 12, one or more command streams that may be executed by shader units 46 of GPU 12. GPU 12 may include command processor 24 that may receive the one or more command streams from GPU driver 22. Command processor 24 may be any combination of hardware and software configured to receive and process one or more command streams. As such, command processor 24 is a stream processor. In some examples, instead of command processor 24, any other suitable stream processor may be usable in place of command processor 24 to receive and process one or more command streams and to perform the techniques disclosed herein. In one example, command processor 24 may be a hardware processor. In the example shown in FIG. 2, command processor 24 may be included in GPU 12. In other examples, command processor 24 may be a unit that is separate from CPU 6 and GPU 12. Command processor 24 may also be known as a stream processor, command/stream processor, and the like to indicate that it may be any processor configured to receive streams of commands and/or operations.

Command processor 24 may process one or more command streams including scheduling operations included in the one or more command streams for execution by GPU 12. Specifically, command processor 24 may process the one or more command streams and schedule the operations in the one or more command streams for execution by shader units 46. In operation, GPU driver 22 may send to command processor 24 a command stream comprising a series of operations to be executed by GPU 12. Command processor 24 may receive the stream of operations that comprise the command stream and may process the operations of the command stream sequentially based on the order of the operations in the command stream and may schedule the operations in the command stream for execution by shader processors 48 of shader units 46.

Command processor 24 may be able to process multiple command streams by context switching amongst the different command streams. For example, GPU driver 22 may direct command processor 24 to switch from processing a first command stream to processing a second command stream. Command processor 24 may, in response to receiving a command from GPU driver 22 to switch from processing the first command stream to processing the second command stream, perform a context switch. Command processor 24 may interrupt processing of the first command stream and, upon interruption of the processing of the first command stream, commence processing of the second command stream.

Subsequently, at a later point, GPU driver 22 may, for example, direct command processor 24 to interrupt processing of the second command stream and to resume processing of the first command stream. Command processor 24 may, in response to receiving a command from GPU driver 22 to switch back from processing the second command stream to process the first command stream, perform a context switch by interrupting processing of the second command stream and restart processing of the first command stream. By performing context switching, command processor 24 may enable multiple command streams to be executed by GPU 12, thereby more efficiently utilizing GPU 12.

However, upon restarting processing of the first command stream, command processor 24 may process operations of the first command stream that may depend on the contents of memory locations in memory (e.g., system memory 10 or graphics memory 40) being identical, during execution of the operations by GPU 12, to the contents of the memory locations prior to command processor 24 interrupting the first content stream. For example, if an operation in the first command stream being executed by GPU 12 subsequent to restarting processing of the first command stream is a memory read operation that reads a specified memory location in memory, and if, during processing of the second command stream prior to command processor 24 restarting processing of the first stream, the GPU 12, CPU 6, or any other suitable device/processor executes an operation in or during the second command stream that modifies the value stored in the specified memory location in memory, then the GPU 12 executing the memory read operation to read the specified memory location may lead to an inconsistent and/or incorrect result.

In accordance with an aspect of the present disclosure, command processor 24 may process command stream 28 for execution by GPU 12, including storing, by command processor 24, data associated with a first set of one or more operations in command stream 28 in trace buffer 26. Command processor 24 may use trace buffer 26 to ensure consistency of the contents of certain memory locations across one or more context switches. A trace buffer may be a buffer in memory where typically trace information for an application is stored, such as information detailing a history of the application's code execution, timing, and/or memory accesses. Similarly, in the example of FIG. 2, trace buffer 26 may be any suitable set of memory locations to which command processor 24 has read and write access.

The first set of one or more operations in the command stream 28 may access one or more memory locations in graphics memory 40 and/or system memory 10, and the data associated with the first set of one or more operations may include an indication of contents of the one or more memory locations associated with the one or more operations. Command processor 24 may store data associated with operations of a command stream as command processor 24 processes the command stream into trace buffer 26. For example, command processor 24 may store in trace buffer 26 data associated with memory access operations (e.g., memory read operations, memory write operations, and the like) as well as data associated with operations that depend upon the value of content in certain memory locations (e.g., read operations, predicates for control flow, and the like). In this way, by storing data associated with operations of a command stream, trace buffer 26 may enable computing device 2 to refrain from persisting the contents of memory locations in graphics memory 40 and/or system memory 10 across context switches.

In the example of FIG. 2, trace buffer 26 is stored in system memory 10. In other examples, trace buffer 26 may be stored in any suitable memory of computing device 2, such as system memory 10, graphics memory 40, and the like. Trace buffer 26 may store data associated with memory access operations (e.g., memory read operations, memory write operations, and the like) as well as data associated with operations that depend upon the value of content in certain memory locations (e.g., read operations, predicates for control flow, and the like). Trace buffer 26 may also store the intermediate results of operations that command processor 24 has received and that GPU 12 has executed. Thus, if command processor 24 resumes processing of a command stream, GPU 12 may depend upon data stored in trace buffer 26 to resume processing command stream 28.

As command processor 24 receives operations of command stream 28 as streamed from GPU driver 22, command processor 24 may process the received operations of command stream 28, including storing into trace buffer 26 data associated with the operations received by command processor 24 from GPU driver 22. As discussed above, the data may be the values of the contents of memory locations accessed by the instructions or the values of the contents of memory locations upon which the results of executing the instructions depend. For example, the data associated with operations received by command processor 24 that command processor 24 may store into trace buffer 26 may also include data associated with conditional statements that depend upon the values of the contents of memory locations. The conditional statements, for example, may be predicates of control flow statements that compare a value with the value stored in a memory location. In another example, if an operation received by command processor 24 is a memory write operation, the command processor 24 may store into trace buffer 26 the value that is written by the write operation to a memory location along with an indication of the memory location to which the value was written. If the operations received by command processor 24 includes multiple memory accesses to the same memory location (e.g., multiple write operations to the same memory location), the command processor 24 may write into trace buffer 26 a history of the contents of that memory location. In this way, command processor 24 may store into trace buffer 26 intermediate values of the operations it processes.

Command processor 24 may interrupt the processing of command stream 28 to pause command stream 28 in order to process and schedule for execution other command streams in order to efficiently utilize GPU 12 in processing multiple command streams. In response to resuming processing of command stream 28 subsequent to the interrupting of the processing of command stream 28, command processor 24 may replay at least a portion of command stream 28 based at least in part on the data stored in trace buffer 26, including processing a second set of one or more operations of command stream 28 based at least in part on the data stored in trace buffer 26. Replaying at least a portion of command stream 28 may include resuming processing and scheduling for execution operations of the at least the portion of command stream 28.

Command stream 28 may include one or more checkpoints that separate blocks of independent operations in command stream 28. The blocks of operations separated by checkpoints may be relatively independent in that, for example, operations in one block may not necessarily access a memory location that is accessed by operations in another block if context switching that occurs between the executions of these operations may potentially introduce data hazards. As such, command processor 24 may resume processing of command stream 28 from the checkpoint in command stream 28 that command processor 24 has most recently encountered.

Resuming processing of command stream 28 from the checkpoint in command stream 28 that command processor 24 has most recently encountered may result in command processor 24 encountering operations of command stream 28 that command processor 24 has already processed and/or scheduled for execution by GPU 12. As such, in resuming processing of command stream 28, command processor 24 may encounter the first set of one or more operations in command stream 28 that it has already previously processed. Command processor 24 therefore may skip processing of operations of command stream 28 it has already processed and scheduled for execution by GPU 12. For operations command processor 24 has processed but not scheduled for execution by GPU 12, command processor 24 may schedule those operations for execution by GPU 12 based at least in part on the data associated with the operations as well as data associated with previous operations of command stream 28 that command processor 24 may have stored into trace buffer 26.

Furthermore, command processor 24 may also encounter operations of command stream 28 that it has not previously processed. These operations may be the second set of one or more operations that command processor 24 may process based at least in part on the data associated with the first set of one or more operations that is stored in trace buffer 26. As such, command processor 24 may process and schedule for execution by GPU 12 these operations based at least in part on the data associated with previous operations of command stream 28 stored by command processor 24 in trace buffer 26. For example, if command processor 24 encounters a read operation, command processor 24 may determine, based on the data stored in trace buffer 26, whether the read operation reads from a memory location that a previous operation processed by command processor 24 has written to. If command processor 24 determines that the read operation does read a memory location that a previous operation processed by command processor 24 has written to, command processor 24 may retrieve the value of the memory location from trace buffer 26 and may schedule the read operation for execution by GPU 12 based on the value of the memory location from trace buffer 26, thereby ensuring the read operation may result in reading the value of the memory location as retrieved from trace buffer 26. As such, command processor 24 may utilize trace buffer 26 to ensure the correctness of results from executing command stream 28.

Figure 3:
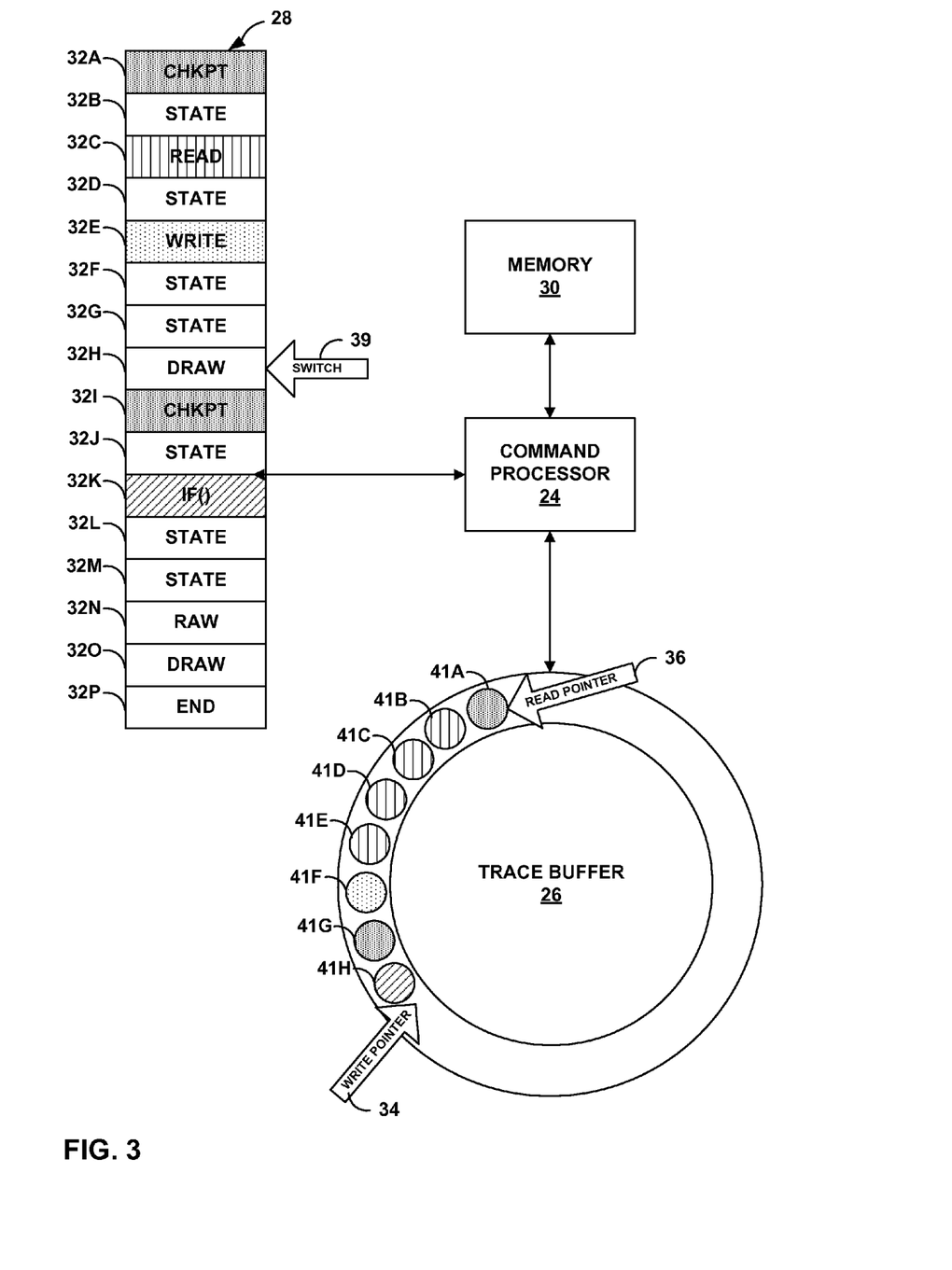
FIG. 3 is a block diagram illustrating an example implementation of the trace buffer of FIG. 2 in further detail.

FIG. 3 is a block diagram illustrating an example implementation of trace buffer 26 of FIG. 2 in further detail. As shown in the example of FIG. 3, command stream 28 may include one or more checkpoints, such as checkpoints 32A and 32I, that separate blocks of independent operations in command stream 28. For example, read operation 32C that reads the same memory location that write operation 32E writes to may be in the same block of operations and thus are not separated by checkpoints as read operation 32C may depend on the value written by write operation 32E.

During processing of command stream 28, command processor 24 may perform a context switch to interrupt processing of command stream 28, so that command processor 24 may process another command stream. By interrupting processing of command stream 28, command processor 24 in effect pauses the processing of command stream 28, so that command processor 24 does not further process any operations in command stream 28 and GPU 12 does not further execute any operations in command stream 28 until command processor 24 performs another context switch to switch back to processing command stream 28.

In response to command processor 24 switching back to processing command stream 28, command processor 24 may resume processing command stream 28 starting at the checkpoint of command stream 28 that command processor 24 had most recently encountered. Because command stream 28 is streamed from GPU driver 22 to command processor 24, command processor 24 processes command stream 28 in order in a sequential fashion. For example, if the most recent operation in command stream 28 that was processed by command processor 24 prior to a context switch away from processing command stream 28 is any of operations 32B-32H, then command processor 24 may resume processing command stream 28 starting from checkpoint 32A. In another example, if the most recent operation in command stream 28 that was processed by command processor 24 prior to a context switch away from processing command stream 28 is any of operations 32J to 32O, then command processor 24 may resume processing command stream 28 starting from checkpoint 32I. In this way, the checkpoints of command stream 28 provide a waypoint for command processor 24 to determine a position in command stream 28 to restart execution of command stream 28.

Trace buffer 26 may be a ring buffer that stores data associated with one or more operations in command stream 28 to aid command processor 24 in restarting processing of command stream 28 after one or more context switches. In alternate examples, trace buffer 26 may be a linear buffer or any other suitable memory for storing data associated with operations in command stream 28.

Trace buffer 26 may store one or more indications of operations in command stream 28 that have already been processed by command processor 24. For example, trace buffer 26 may store an index of the operations in command stream 28 as well as an index of operations in command stream 28 that command processor 24 has already processed. Trace buffer 26 may also store an indication of operations in command stream 28 that have been scheduled for execution by GPU 12. For example, trace buffer 26 may store an index of operations command processor 24 has scheduled for execution by GPU 12. It should be understood that just because command processor 24 has already processed a specified operation does not necessarily also mean that GPU 12 has executed the operation because GPU sub-systems 12 may not necessarily be in sync with command processor 24 or CPU 6. Furthermore, command processor 24 may perform a context switch after processing an operation but before command processor 24 has scheduled the operation for execution by GPU 12. As such, trace buffer 26 may not be able to store an indication of whether GPU 12 has executed a certain operation, but may be able to store an indication of whether command processor 24 has processed the operation and whether command processor has scheduled the operation to be executed by GPU 12.

Trace buffer 26 may be able to store, at one time or another, data associated with each operation in command stream 28. However, if trace buffer 26 is currently storing data associated with a first checkpoint in a command stream, and if subsequently command processor 24 processes a second checkpoint in the same command stream, command processor 24 may purge from trace buffer 26 data associated with operations in the command stream prior to the second checkpoint. In the example shown in FIG. 3, trace buffer 26 may include data associated with checkpoint 32A as well as data associated with operations 32B-32H. Responsive to command processor 24 processing checkpoint 32I, command processor 24 may purge from trace buffer 26 the data associated with checkpoint 32A as well as data associated with operations 32B-32H, so that subsequent to purging that data only data associated with checkpoint 32I is stored in trace buffer 26. In this way, trace buffer 26 may be of a size that is sufficient to store no more than the data associated with operations between two checkpoints in the command stream.

Trace buffer 26 may store nodes 41A-41H ("nodes 41") that each includes data associated with an operation of command stream 28. Trace buffer 26 may store nodes 41 sequentially according to the order of the associated operations of command stream 28. For example, if node 41A includes data associated with checkpoint 32A, and node 41B includes data associated with read operation 32C, node 41A is sequentially before node 41B in trace buffer 26.

In the example of FIG. 3, command processor 24 may not record data into trace buffer 26 for every operation of command stream 28 that it processes. Thus, trace buffer 26 may not include a node for each operation of command stream 28 that is processed by command processor 24. Rather, command processor 24 may only record into trace buffer 26 data associated with operations whose consistency cannot be guaranteed after interruption and resumption of processing of command stream 28, and may omit from recording into trace buffer 26 data associated with operations whose consistency can be guaranteed after interruption and resumption of processing of command stream 28.

For example, command processor 24 may store data associated with read operation 32C into nodes 41B-41E in trace buffer 26, data associated with write operation 32E into node 41F in trace buffer 26, and data associated with "if" conditional operation 32K into node 41H in trace buffer 26. Command processor 24 may also omit from recording into trace buffer 26 data associated with GPU state operations that are self-sufficient and/or deterministic as long as the original command stream is present. Thus, command processor 24 may not record into trace buffer 26 data associated with state operations 32B, 32D, 32F, 32G, 32J, and the like.

Command processor 24 may utilize read pointer 36 for reading from trace buffer 26 and may utilize write pointer 38 for writing to trace buffer 26. Read pointer 36 may point to a node of nodes 41 that is associated with the first valid operation in trace buffer 26. When command processor 24 context switches away from command stream 28, command processor 24 may record data associated with the last operation of command stream 28 it processes into trace buffer 26 and sets read pointer 36 to point to the first node in trace buffer 26 that is associated with a checkpoint. Thus, upon command processor 24 resuming processing of command stream 28, command processor 24 may start reading trace buffer 26 from the node that read pointer 36 points to. Meanwhile, write pointer 38 may point to a memory location in trace buffer 26 that is subsequent to the last node in trace buffer 26.

As discussed above, in response to command processor 24 switching back to processing command stream 28, command processor 24 may resume processing command stream 28 starting at the checkpoint of command stream 28 that command processor 24 had most recently encountered. Thus, even if command processor 24 had already previously processed one or more operations subsequent to the checkpoint in command stream 28 prior to the context switch, command processor 24 may encounter those same one or more operations again after resuming processing of command stream 28.

However, because trace buffer 26 may store intermediate results as well as memory contents from processing, by command processor 24, and execution, by GPU 12, of operations of command stream 28 prior to command processor 24's interruption of the processing of command stream 28, command processor 24's subsequent resumption of processing of command stream 28 may be able to rely on the intermediate results stored in trace buffer 26 to ensure the correctness of the results from GPU 12's execution of the operations of command stream 28. In the example of FIG. 3, prior to command processor 24 performing context switch 39, command processor 24 may have already processed read operation 32C, which may be a data read from a specific memory location of memory 30. Processing read operation 32C may include storing, by command processor 24 into trace buffer 26, data associated with read operation 32C. For example, the data associated with read operation 32C may be the memory contents of the specific memory location of memory 30 that is read by read operation 32C.

In the interim, as command processor 24 interrupts processing of command stream 28, it may be possible that GPU 12 may execute a write command to that same specific memory location of memory 30. Subsequently, command processor 24 may resume processing of command stream 28 from checkpoint 32A. In this example, command processor 24 may once again re-process read operation 32C. Because the contents of the specific memory location of memory 30 may have changed in the interim, command processor 24 may determine the result of re-executing read operation 32C based at least in part on the data stored in trace buffer 26 that is associated with read operation 32C. Thus, in response to encountering read operation 32C, command processor 24 may, for example, enable GPU 12 to perform read operation 32C by reading the memory contents of the specific memory location of memory 30 as stored into trace buffer 26. In this way, command processor 24 may utilize trace buffer 26 to ensure the correctness of results from GPU 12 executing command stream 28 across context switches.

Figure 4:
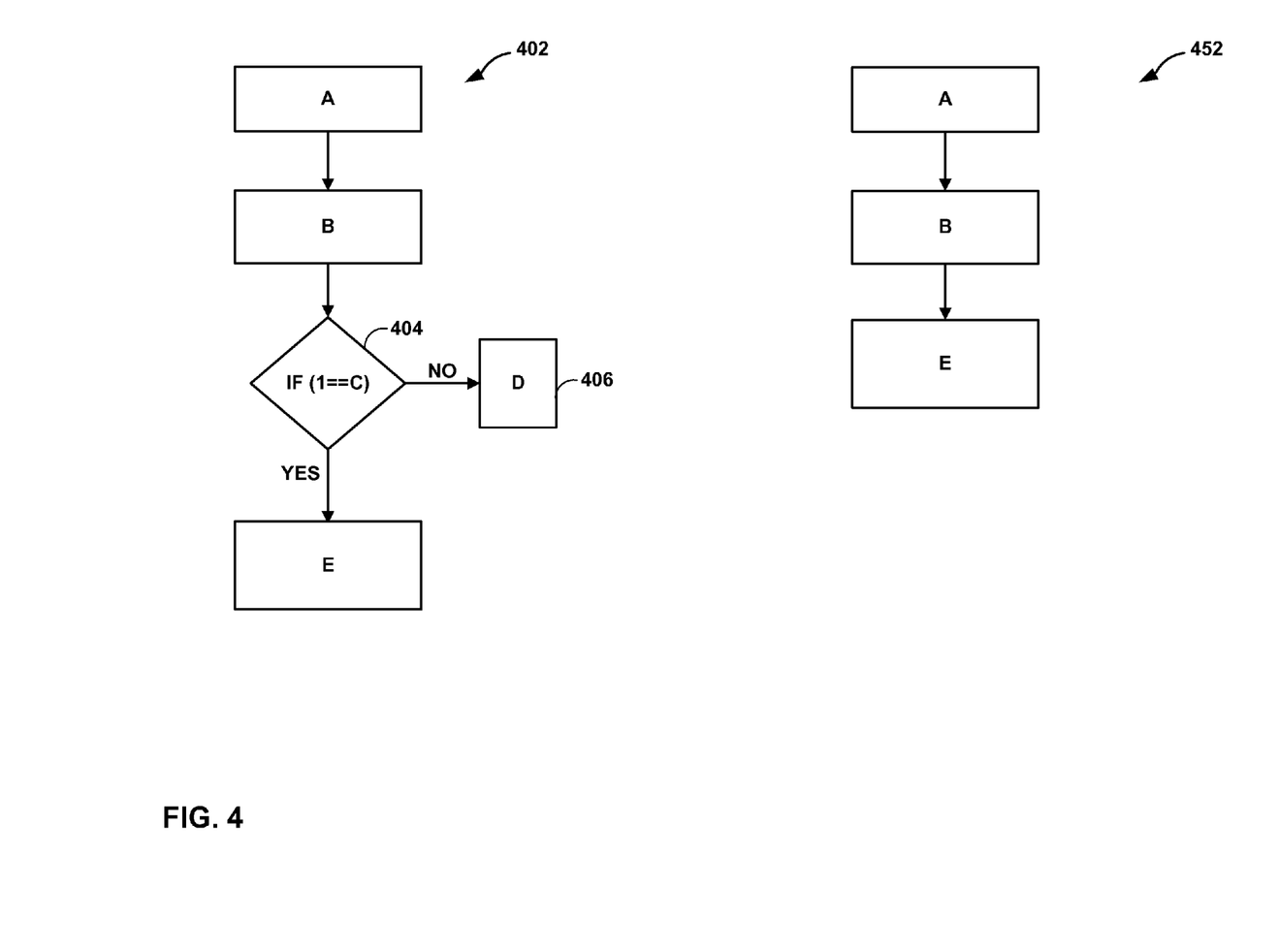
FIG. 4 is a block diagram illustrating an example operation of the command processor and the trace buffer.

FIG. 4 is a block diagram illustrating an example operation of command processor 24 and trace buffer 26 of FIG. 2 and FIG. 3 in further detail. As shown in FIG. 4, command processor 24 may flatten the execution path of command streams based at least in part on trace buffer 26. For example, command stream 28 may include one or more control flow statements, such as predicate 32K to result in branching execution path 402 that may depend upon evaluating the value of variable "c" to determine whether "if" condition 404 is satisfied.

Command processor 24 may receive and process operations of command stream 28 that encompasses branching execution path 402, and may evaluate predicate 32K, including evaluation the value of variable "c" to determine whether condition 404 is satisfied. Command processor 24 may flatten branching execution path 402 based at least in part on the value of variable "c" stored in trace buffer 26 to result in flattened execution path 452. Flattening branching execution path 402 may include determining the operations that command processor 24 takes through branching execution path 402. For example, flattening branching execution path 402 may omit condition 404 from flattened execution path 452 because command processor 402 has resolved the condition. Flattening branch execution path 402 may also include omitting operation 406 from flattened execution path 452 because command processor 24 determines that operation 406 will not be executed based on evaluating the predicate included in condition 404.

Command processor 24 may store data associated with flattened execution path 452 in trace buffer 26, such as storing an indication of the operations of command stream 28 associated with flattened execution path 452 in trace buffer 26. Command processor 24 may, when scheduling execution of operations associated with branching execution path 402 for execution by GPU 12, instead schedule the operations associated with flattened execution path 452 for execution by GPU 12. In this way, command processor 24 may more efficiently utilize trace buffer 26 by storing less data in trace buffer 26 and may also more efficiently utilize GPU 12 by scheduling flattened execution path 452 for execution instead of branching execution path 402.

Figure 5:
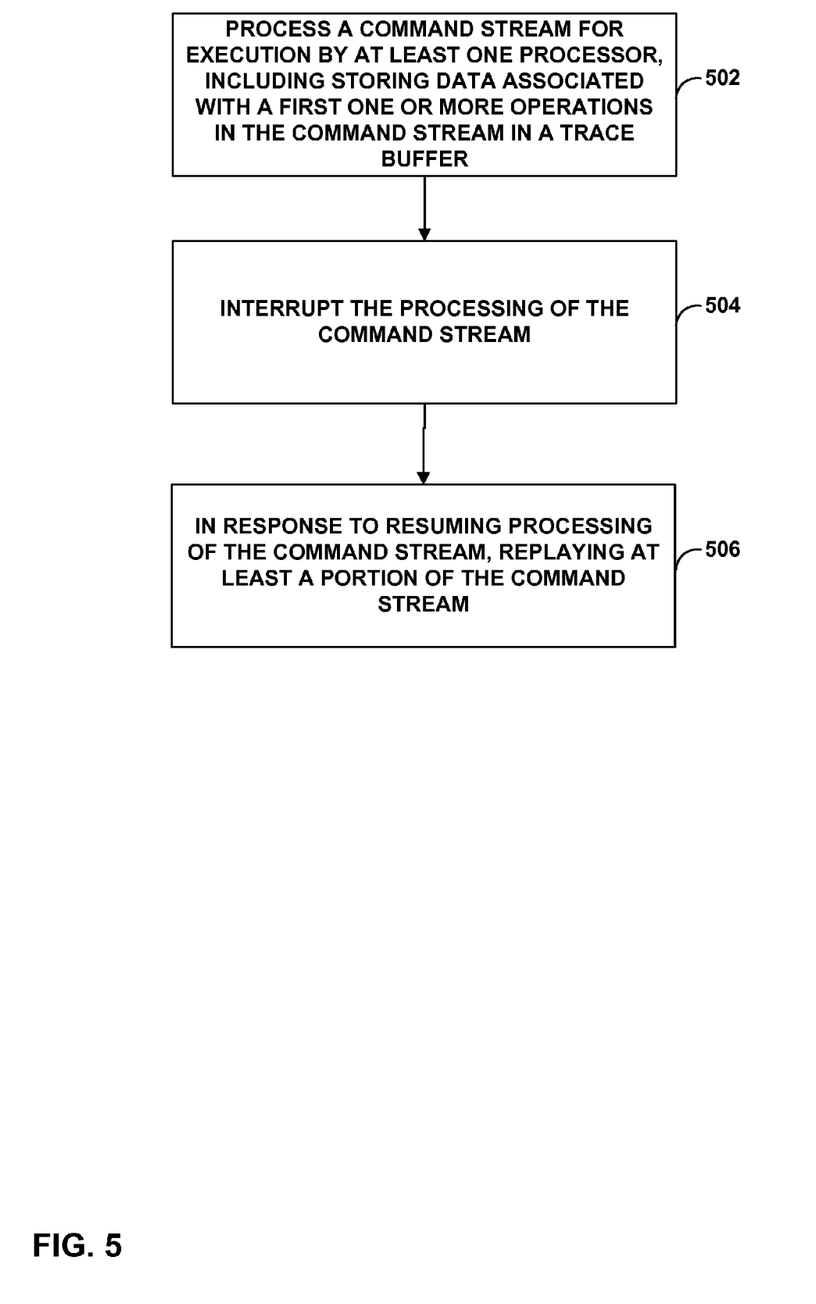
FIG. 5 is a flow chart illustrating an example operation of the command processor.

FIG. 5 is a flow chart illustrating an example operation of command processor 24 of FIGS. 2 to 4 in further detail. As shown in FIG. 5, command processor 24 may process command stream 28 for execution by at least one processor, such as GPU 12, including storing, by command processor 24, data associated with a first set of one or more operations in command stream 28 in trace buffer 26 (502). The first set of one or more operations in command stream 28 may access one or more memory locations in memory, such as system memory 10 or graphics memory 40. The data associated with the first set of one or more operations may include an indication of contents of the one or more memory locations associated with the first set of one or more operations. Command processor 24 may interrupt the processing of the command stream 28 (504). Command processor 24 may, in response to resuming processing of command stream 28 subsequent to the interrupting of the processing of command stream 28, replay at least a portion of command stream 28, including processing, by command processor 24, a second set of one or more operations of command stream 28 based at least in part on the data stored in trace buffer 26 (506).

In some examples, an indication of contents of the one or more memory locations associated with the first set of one or more operations comprises the contents of the one or more memory locations. In some examples, the first set of one or more operations in the command stream comprise at least one of: one or more write operations to the one or more memory locations in the memory, or one or more read operations from the one or more memory locations in the memory. In some examples, the first set of one or more operations in the command stream comprise a comparison of at least one value with the contents of the one or more memory locations.

In some examples, the first set of one or more operations in the command stream comprise a control flow statement. In some examples, storing, by command processor 24, data associated with the first set of one or more operations in command stream 28 in trace buffer 26 further includes evaluating the control flow statement, determining an execution path of the first set of one or more operations based at least in part on the evaluation of the control flow statement, flattening the execution path, and storing data associated with the flattened execution path in the trace buffer 26. In some examples, the method further includes scheduling, by the command processor, the first set of one or more operations associated with the flatted execution path for execution by the at least one processor.

In some examples, a result of executing the second set of one or more operations in command stream 28 depends upon the contents of the one or more memory locations in the memory stored in the trace buffer prior to the interrupting, by the command processor, of the processing of the command stream, regardless of additional one or more write operations to the one or more memory locations in the memory or one or more read operations from the one or more memory locations in the memory subsequent to the interrupting of the processing of the command stream.

In some examples, command stream 28 includes a plurality of checkpoints that separates one or more blocks of operations in command stream 28. In some examples, replaying at least a portion of command stream 28 based at least in part on the data stored in trace buffer 26 includes resuming processing of command stream 28 starting from a most recently encountered checkpoint of the plurality of checkpoints in command stream 28.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method for replaying a command stream, comprising:
processing, by a command processor, a command stream for execution by at least one processor, including storing, by the command processor, data associated with a first set of one or more operations in the command stream in a trace buffer,
wherein the first set of one or more operations in the command stream accesses one or more memory locations in memory, and
wherein the data associated with the first set of one or more operations include an indication of contents of the one or more memory locations associated with the first set of one or more operations;
interrupting, by the command processor, the processing of the command stream; and
in response to resuming, by the command processor, processing of the command stream subsequent to the interrupting of the processing of the command stream, replaying, by the command processor, at least a portion of the command stream, including processing, by the command processor, a second set of one or more operations of the command stream based at least in part on the data stored in the trace buffer that is associated with the first set of one or more operations.

2. The method of claim 1, wherein an indication of contents of the one or more memory locations associated with the first set of one or more operations comprises the contents of the one or more memory locations.

3. The method of claim 1, wherein the first set of one or more operations in the command stream comprise at least one of: one or more write operations to the one or more memory locations in the memory, or one or more read operations from the one or more memory locations in the memory.

4. The method of claim 1, wherein the first set of one or more operations in the command stream comprise a comparison of at least one value with the contents of the one or more memory locations.

5. The method of claim 1, wherein the first set of one or more operations in the command stream comprise a control flow statement.

6. The method of claim 5, wherein storing, by the command processor, data associated with the first set of one or more operations in the command stream in the trace buffer further comprises:
evaluating the control flow statement;
determining an execution path of the first set of one or more operations based at least in part on the evaluation of the control flow statement;
flattening the execution path; and
storing data associated with the flattened execution path in the trace buffer.

7. The method of claim 6, further comprising:
scheduling, by the command processor, the first set of one or more operations associated with the flatted execution path for execution by the at least one processor.

8. The method of claim 1, further comprising:
executing, with the at least one processor, the second set of one or more operations in the command stream to generate a result that is based upon the contents of the one or more memory locations in the memory stored in the trace buffer prior to the interrupting, by the command processor, of the processing of the command stream, regardless of additional one or more write operations to the one or more memory locations in the memory or one or more read operations from the one or more memory locations in the memory subsequent to the interrupting of the processing of the command stream.

9. The method of claim 1, wherein the command stream includes a plurality of checkpoints that separates one or more blocks of operations in the command stream.

10. The method of claim 9, wherein replaying at least a portion of the command stream based at least in part on the data stored in the trace buffer comprises:
resuming processing of the command stream starting from a most recently encountered checkpoint of the plurality of checkpoints in the command stream.

11. A device configured for of graphics processing comprising:
at least one processor;
a memory;
a command processor configured to:
process a command stream for execution by the at least one processor, including storing data associated with a first set of one or more operations in the command stream in a trace buffer, wherein the first set of one or more operations in the command stream accesses one or more memory locations in the memory, and wherein the data associated with the first set of one or more operations include an indication of contents of the one or more memory locations associated with the first set of one or more operations;

interrupt the processing of the command stream; and in response to resuming processing of the command stream subsequent to the interrupting of the processing of the command stream, replay at least a portion of the command stream, including processing a second set of one or more operations of the command stream based at least in part on the data stored in the trace buffer that is associated with the first set of one or more operations.

12. The device of claim 11, wherein an indication of contents of the one or more memory locations associated with the first set of one or more operations comprises the contents of the one or more memory locations.

13. The device of claim 11, wherein the first set of one or more operations in the command stream comprise at least one of: one or more write operations to the one or more memory locations in the memory, or one or more read operations from the one or more memory locations in the memory.

14. The device of claim 11, wherein the first set of one or more operations in the command stream comprise a comparison of at least one value with the contents of the one or more memory locations.

15. The device of claim 11, wherein the at least one processor is further configured to execute the second set of one or more operations in the command stream to generate a result that is based upon the contents of the one or more memory locations in memory.

16. The device of claim 11, wherein the command stream includes a plurality of checkpoints that separates one or more blocks of operations in the command stream.

17. The device of claim 16, wherein the command processor is further configured to:

resume processing of the command stream starting from a most recently encountered checkpoint of the plurality of checkpoints in the command stream.

18. A non-transitory computer-readable storage medium having instructions stored thereon that when executed cause one or more processors to perform operations comprising:

processing a command stream for execution by at least one processor, including storing, by the command processor, data associated with a first set of one or more operations in the command stream in a trace buffer, wherein the first set of one or more operations in the command stream accesses one or more memory locations in memory, and wherein the data associated with the first set of one or more operations include an indication of contents of the one or more memory locations associated with the first set of one or more operations;

interrupting the processing of the command stream; and in response to resuming processing of the command stream subsequent to the interrupting of the processing of the command stream, replaying at least a portion of the command stream, including processing a second set of one or more operations of the command stream based at least in part on the data stored in the trace buffer that is associated with the first set of one or more operations.

19. The non-transitory computer-readable storage medium of claim 18, wherein an indication of contents of the one or more memory locations associated with the first set of one or more operations comprises the contents of the one or more memory locations.

20. The non-transitory computer-readable storage medium of claim 18, wherein the first set of one or more operations in the command stream comprise at least one of: one or more write operations to the one or more memory locations in the memory, or one or more read operations from the one or more memory locations in the memory.

21. The non-transitory computer-readable storage medium of claim 18, wherein the first set of one or more operations in the command stream comprise a comparison of at least one value with the contents of the one or more memory locations.

22. The non-transitory computer-readable storage medium of claim 18, further comprising:

executing the second set of one or more operations in the command stream to generate a result that is based upon the contents of the one or more memory locations in memory stored in the trace buffer prior to the interrupting, by the command processor, of the processing of the command stream, regardless of additional one or more write operations to the one or more memory locations in the memory or one or more read operations from the one or more memory locations in the memory subsequent to the interrupting of the processing of the command stream.

23. The non-transitory computer-readable storage medium of claim 18, wherein the command stream includes a plurality of checkpoints that separates one or more blocks of operations in the command stream.

24. The non-transitory computer-readable storage medium of claim 23, wherein operations further comprise:

resume processing of the command stream starting from a most recently encountered checkpoint of the plurality of checkpoints in the command stream.

25. A device comprising:

means for processing a command stream for execution by at least one processor, including storing, by the command processor, data associated with a first set of one or more operations in the command stream in a trace buffer, wherein the first set of one or more operations in the command stream accesses one or more memory locations in memory, and wherein the data associated with the first set of one or more operations include an indication of contents of the one or more memory locations associated with the first set of one or more operations;

means for interrupting the processing of the command stream; and in response to resuming processing of the command stream subsequent to the interrupting of the processing of the command stream, means for replaying at least a portion of the command stream, including means for processing a second set of one or more operations of the command stream based at least in part on the data stored in the trace buffer that is associated with the first set of one or more operations.

26. The device of claim 25, wherein an indication of contents of the one or more memory locations associated with the first set of one or more operations comprises the contents of the one or more memory locations.

27. The device of claim 25, wherein the first set of one or more operations in the command stream comprise at least one of: one or more write operations to the one or more memory locations in the memory, or one or more read operations from the one or more memory locations in the memory.

28. The device of claim 25, further comprising:
means for executing the second set of one or more operations in the command stream to generate a result that is based upon the contents of the one or more memory locations in the memory.

29. The device of claim 25, wherein the command stream includes a plurality of checkpoints that separates one or more blocks of operations in the command stream.

30. The device of claim 29, wherein the means for replaying at least a portion of the command stream based at least in part on the data stored in the trace buffer further comprise:
means for resuming processing of the command stream starting from a most recently encountered checkpoint of the plurality of checkpoints in the command stream.

* * * * *